(12) United States Patent
Kido et al.

(10) Patent No.: US 11,412,749 B2
(45) Date of Patent: Aug. 16, 2022

(54) PROCESSING SYSTEM FOR BONE-IN LIMB MEATS AND PRODUCING METHOD FOR DEBONED MEATS

(71) Applicant: MAYEKAWA MFG. CO., LTD., Tokyo (JP)

(72) Inventors: Koji Kido, Tokyo (JP); Naoki Toyoda, Tokyo (JP); Hiroyuki Sakurayama, Tokyo (JP); Akira Koizumi, Tokyo (JP); Hajime Akabane, Tokyo (JP); Moemi Kato, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 422 days.

(21) Appl. No.: 16/603,640

(22) PCT Filed: Dec. 19, 2018

(86) PCT No.: PCT/JP2018/046692
§ 371 (c)(1),
(2) Date: Oct. 8, 2019

(87) PCT Pub. No.: WO2019/131363
PCT Pub. Date: Jul. 4, 2019

(65) Prior Publication Data
US 2021/0084916 A1 Mar. 25, 2021

(30) Foreign Application Priority Data
Dec. 25, 2017 (JP) .............................. JP2017-247369

(51) Int. Cl.
*A22C 21/00* (2006.01)
*A22C 17/00* (2006.01)

(52) U.S. Cl.
CPC ........ *A22C 21/0076* (2013.01); *A22C 17/004* (2013.01); *A22C 21/0023* (2013.01); *A22C 21/0053* (2013.01)

(58) Field of Classification Search
CPC ... A22C 21/00; A22C 21/0076; A22C 17/004; A22C 21/0053; A22C 17/0093; A22C 17/006; A22C 21/0069
(Continued)

(56) References Cited

U.S. PATENT DOCUMENTS 5,071,388 A    12/1991  Lindert
5,173,077 A *  12/1992  van den Nieuwelaar ...................
                                                    A22B 5/0058
                                                        452/155
(Continued)

FOREIGN PATENT DOCUMENTS

EP    2153727 A1    2/2010
EP    2277382 A1    1/2011
(Continued)

OTHER PUBLICATIONS

International Search Report issued in Intl. Appln. No PCT/JP2018/046692 dated Apr. 2, 2019. English translation provided.
(Continued)

*Primary Examiner* — Richard T Price, Jr.
(74) *Attorney, Agent, or Firm* — Rossi, Kimms & McDowell LLP (57) ABSTRACT

A processing system for bone-in limb meats according to an embodiment includes: a right-limb incision-forming portion for forming incision on a right bone-in limb meat; a left-limb incision-forming portion for forming incision on a left bone-in limb meat; a processing line including a plurality of processing stations to separate a bone part and a meat part of each bone-in limb meat on which incision is formed at the
(Continued)

right-limb incision-forming portion or the left-limb incision-forming portion; and a loading portion arranged at an uppermost stream part of the processing line to receive the right bone-in limb meat with incision formed at the right-limb incision-forming portion and the left bone-in limb meat with incision formed at the left-limb incision-forming portion.

11 Claims, 5 Drawing Sheets

(58) Field of Classification Search
USPC ............... 452/135, 136, 166, 167, 169, 170
See application file for complete search history.

(56) References Cited

U.S. PATENT DOCUMENTS

| 5,188,559 | A | * | 2/1993 | Hazenbroek | ....... | A22C 21/0023 |
|---|---|---|---|---|---|---|
| | | | | | | 452/167 |
| 5,429,549 | A | * | 7/1995 | Verrijp | ............... | A22C 21/0023 |
| | | | | | | 452/167 |
| 5,618,230 | A | * | 4/1997 | Bargele | .............. | A22C 21/0023 |
| | | | | | | 452/169 |
| 5,954,574 | A | * | 9/1999 | Verrijp | ............... | A22C 21/0023 |
| | | | | | | 452/169 |
| 7,232,365 | B2 | * | 6/2007 | Annema | ........... | A22C 21/0076 |
| | | | | | | 452/167 |
| 7,335,095 | B2 | * | 2/2008 | Sekiguchi | .......... | A22C 21/0023 |
| | | | | | | 452/169 |
| 7,341,505 | B1 | * | 3/2008 | Gasbarro | ........... | A22C 21/0023 |
| | | | | | | 452/169 |
| 8,277,294 | B2 | * | 10/2012 | Van Hillo | .......... | A22C 21/0076 |
| | | | | | | 452/148 |
| 9,326,527 | B2 | * | 5/2016 | Kido | ................... | A22C 21/0076 |
| 9,795,149 | B2 | * | 10/2017 | Ebbers | ............... | A22C 21/0076 |
| 2012/0231715 | A1 | | 9/2012 | Kodama | | |
| 2012/0315834 | A1 | | 12/2012 | Van Der Steen | | |
| 2014/0376693 | A1 | | 12/2014 | Taniguchi | | |

FOREIGN PATENT DOCUMENTS

| EP | 1929874 B1 | 7/2013 |
|---|---|---|
| JP | H3117451 A | 5/1991 |
| JP | H05236868 A | 9/1993 |
| JP | 2013507101 A | 3/2013 |
| WO | 2008136513 A1 | 11/2008 |
| WO | 2009139031 A1 | 11/2009 |
| WO | 2011074966 A1 | 6/2011 |
| WO | 2013136994 A1 | 9/2013 |

OTHER PUBLICATIONS

Written Opinion issued in Intl. Appln. No. PCT/JP2018/046692 dated Apr. 2, 2019.
English translation of Written Opinion issued in Intl. Appln. No. PCT/JP2018/046692 dated Apr. 2, 2019, previously cited on Oct. 8, 2019.
Extended European Search Report issued in European Application No. 18896962.0 dated Apr. 22, 2020.

* cited by examiner

PROCESSING SYSTEM FOR BONE-IN LIMB MEATS AND PRODUCING METHOD FOR DEBONED MEATS

TECHNICAL FIELD

The present disclosure relates to a processing system for bone-in limb meats and a producing method for deboned meats.

BACKGROUND

In order to save labor, a process of dismantling an edible chicken carcass undergoes transition from manual processing to automatic processing using a machine.

As an example of an automatic processing machine, Patent Document 1 discloses an automatic deboner which performs a process of deboning bone-in thigh meats. The deboner conveys each bone-in thigh meat among a plurality of processing stations while suspending it with a clamping device, and sequentially performs steps of forming incision on the bone-in thigh meat, performing bone-meat separation, and the like in the corresponding stations. Thus, automatic deboning can be performed.

Patent Document 2 discloses a machine in which operation is automated to hold a bone-in thigh meat conveyed by a conveyor by a multi-axes articulated arm and to suspend it to a hanger.

CITATION LIST

Patent Literature

Patent Document 1: JP2013-507101A
Patent Document 2: WO2009/139031A

SUMMARY

Technical Problem

The automatic deboner disclosed in Patent Document 1 is a dedicated machine for bone-in thigh meats of right or left limbs and cannot perform deboning of bone-in thigh meats of both the right and left limbs.

The machine disclosed in Patent Document 2 is capable of performing deboning processing for both the right and left limbs. However, the machine is suitable to deboning processing of a large size bone-in thigh meat such as a thigh meat of pork, and performs measurement from a limb neck part to a knee joint part for each individual, determines an incision-forming path based on the measurement result, and performs deboning. Therefore, processing number per unit time (throughput) cannot be increased.

An object of one embodiment is to enable saving installation space of equipment while enabling increase of throughput, when performing dismantling processing of bone-in limb meats of right and left limbs.

Solution to Problem (1) A processing system for bone-in limb meats includes: a right-limb incision-forming portion for forming incision on a right bone-in limb meat; a left-limb incision-forming portion for forming incision on a left bone-in limb meat; a processing line including a plurality of processing stations to separate a bone part and a meat part of each bone-in limb meat on which incision is formed at the right-limb incision-forming portion or the left-limb incision-forming portion; and a loading portion arranged at an uppermost stream part of the processing line to receive the right bone-in limb meat with incision formed at the right-limb incision-forming portion and the left bone-in limb meat with incision formed at the left-limb incision-forming portion.

With the above processing system, through separating the incision-forming portions for the right and left limbs, incision-forming position and configuration of an incision-forming blade of each incision-forming portion can be set fitted to shapes of each bone-in limb meat. Accordingly, since it is not required to change the position and configuration of the incision-forming blade for each of the right and left limbs, the configuration of each incision-forming portion can be simplified and throughput can be increased. Further, since processing on both the right and left limbs after incision-forming is performed at the single processing line, installation space of the processing line can be saved.

(2) In an embodiment, in the above configuration (1), each of the right-limb incision-forming portion and the left-limb incision-forming portion includes a conveying path arranged along a horizontal direction, and a first cutting blade for performing incision-forming on the bone-in limb meat conveyed on the conveying path, and the right-limb incision-forming portion and the left-limb incision-forming portion, including the conveying paths and the first cutting blades, are arranged symmetrically about a center line between the conveying paths.

With the above configuration (2), since the right-limb incision-forming portion and the left-limb incision-forming portion are arranged symmetrically about the center line between the conveying paths, when the right and left bone-in limb meats are loaded to the conveying paths in the same orientation and the first cutting blades are inserted thereto from the same side being the inner side or outer side, incision can be formed on both of the right and left bone-in limb meats respectively from an inner side face where skin does not exist. Thus, high-commercial-value boneless meats to keep skin uncut can be obtained.

(3) In an embodiment, in the above configuration (2), the conveying path of the right-limb incision-forming portion and the conveying path of the left-limb incision-forming portion are arranged in parallel so that the bone-in limb meats are conveyed in an identical conveying direction.

With the above configuration (3), since the conveying paths of the right and left incision-forming portions are arranged in parallel, space of the incision-forming portions can be saved. Further, placing portions to place the bone-in limb meats to the conveying paths can be arranged closely to each other, so that operation of placing can be performed by a single worker.

(4) In an embodiment, in the above configuration (2) or (3), each conveying path is configured to be capable of performing conveyance with the bone part of each bone-in limb meat oriented along the horizontal direction and an inner side face and an outer side face of the bone-in limb meat oriented along a vertical direction.

With the above configuration (4), through conveying the right and left bone-in limb meats in the above described posture, cutting between the bone part and the meat part can be performed along the bone part by the fixed first cutting blades while conveying the right and left bone-in limb meats. Accordingly, since it is not required to stop the bone-in limb meat for incision-forming, processing efficiency can be improved. Further, since the first cutting blade may be a fixed blade, a driving portion for the first cutting blade is unnecessary, resulting in cost reduction.

(5) In an embodiment, in any of the above configurations (2) to (4), each of the right-limb incision-forming portion and the left-limb incision-forming portion includes a plurality of first clamping units capable of moving along the corresponding conveying path while holding the bone-in limb meat, the processing line includes a plurality of second clamping units conveying the bone-in limb meats received from the plurality of first clamping units to the plurality of processing stations, the loading portion includes a first receiving portion receiving the right bone-in limb meat from the right-limb incision-forming portion and a second receiving portion receiving the left bone-in limb meat from the left-limb incision-forming portion, with distance between the first receiving portion and the second receiving portion being the same as distance between the adjacent second clamping units, and receiving the right bone-in limb meat at the first receiving portion and receiving the left bone-in limb meat at the second receiving portion are simultaneously performed.

With the above configuration (5), synchronous control of operation of the first clamping units and the second clamping units when delivering the right and left bone-in limb meats from the first clamping units to the second clamping units is facilitated.

(6) In an embodiment, in the above configuration (5), distance between the adjacent first clamping units and the distance between the adjacent second clamping units are the same, and moving speed of the plurality of the second clamping units are faster than moving speed of the plurality of the first clamping units.

With the above configuration (6), synchronous control of operation of the first clamping units and the second clamping units when delivering the right and left bone-in limb meats from the first clamping units to the second clamping units is facilitated. Further, processing speed of the bone-in limb meat at the processing line is faster than that at the incision-forming portions. Therefore, processing efficiency at the processing line can be improved.

(7) In an embodiment, in the above configuration (5) or (6), at least one of the processing stations includes a second cutting blade for cutting a periphery of the bone part and a separating member capable of engaging with the meat part of the bone-in limb meat cut by the second cutting blade and capable of tearing the meat part from the bone part by being moved away from the corresponding second clamping unit, and the separating member is configured to be capable of moving at the same speed as conveying speed of the second clamping units in synchronization with the second clamping units along a conveying direction of the second clamping units.

With the above configuration (7), the separating member moves along the same direction as the conveying direction of the second clamping unit at the same speed as the conveying speed of the second clamping unit. Accordingly, since the bone-in limb meat is not required to be stopped during a process of bone-meat separation, dismantling processing efficiency can be improved.

(8) In an embodiment, in the above configuration (7), the plurality of processing stations includes a limb neck cutting station including the second cutting blade for cutting a tendon adhering around a limb neck part of the bone-in limb meat, and an albuginea cutting station arranged at a downstream side of the limb neck cutting station in a conveying direction of the bone-in meat and including the separating member for separating a meat part at the cut part of the bone-in limb meat having the cut tendon at the limb neck part from the bone part and the second cutting blade for cutting albuginea adhering around the bone part with the meat part separated.

With the above configuration (8), albuginea is not cut at the limb neck cutting station, but cut at the albuginea cutting station. Accordingly, a fibula adhering to a knee joint part at an inner side of the albuginea can be prevented from being separated from the bone part. Therefore, devaluing of the boneless meat due to mixing of the fibula to the boneless meat can be prevented.

(9) A producing method for deboned meats includes: an incision-forming step of performing incision-forming on a right bone-in limb meat and a left bone-in limb meat respectively at different incision-forming portions; a loading step of loading the right bone-in limb meat and the left bone-in limb meat with incision formed to a single processing line for separating a bone part and a meat part of each bone-in limb meat; and a processing step of separating the bone part and the meat part of each of the right bone-in limb meat and the left bone-in limb meat loaded to the processing line.

With the above method (9), through separating the incision-forming portions for the right and left limbs, incision-forming position and configuration of the incision-forming blade of each incision-forming portion can be set fitted to shapes of each bone-in limb meat. Accordingly, since it is not required to change the position and configuration of the incision-forming blade for each of the right and left limbs, the configuration of each incision-forming portion can be simplified and throughput can be increased. Further, since processing on both the right and left limbs after incision-forming is performed at the single processing line, installation space of the processing line can be saved.

(10) In an embodiment, in the above method (9), at the incision-forming step, throughput for the right bone-in limb meats is the same as throughput for the left bone-in limb meats, and throughput for the bone-in limb meats at the processing step is larger than the throughput at the incision-forming step.

With the above method (10), throughput for the right bone-in limb meats and throughput for the left bone-in limb meats at the incision-forming step are set to be the same. Therefore, the operation of the incision-forming blades at the right and left incision-forming portions can be easily synchronized and the incision-forming operation can be easily controlled.

Further, throughput for the bone-in limb meats at the processing step after incision-forming is set larger than throughput at the incision-forming step. Therefore, operation of the first clamping units and operation of the second clamping units are easily controlled to be synchronized and processing efficiency after incision-forming is improved without lowering throughput at the incision-forming step.

(11) In an embodiment, in the above method (9) or (10), loading to the processing line is performed with knee parts of the plurality of the bone-in limb meats constantly oriented in an identical direction at the loading step.

According to the above method (11), since the joint parts of the plurality of the bone-in limb meats are loaded to the processing line as being always oriented in the same direction, dismantling processing for the right and left bone-in limb meats can be performed with common processing operation of equipment arranged at the processing line. Accordingly, processing efficiency can be improved.

Advantageous Effects

According to an embodiment, it is possible to save installation space of equipment while enabling increase of throughput, when performing dismantling processing of bone-in limb meats of right and left limbs.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
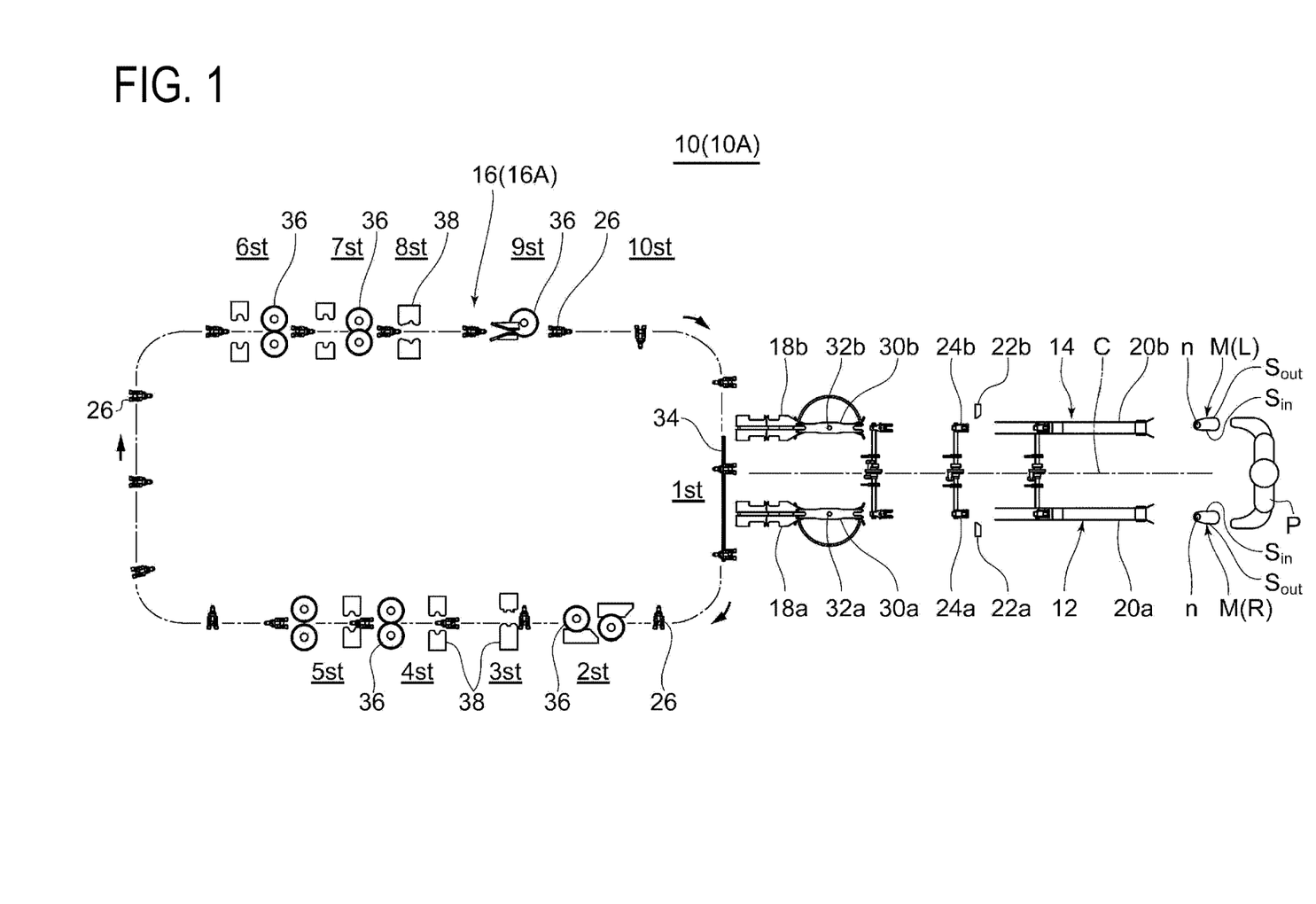
FIG. 1 is a diagram illustrating an entire configuration of a processing system for bone-in limb meats according to an embodiment.
Figure 2:
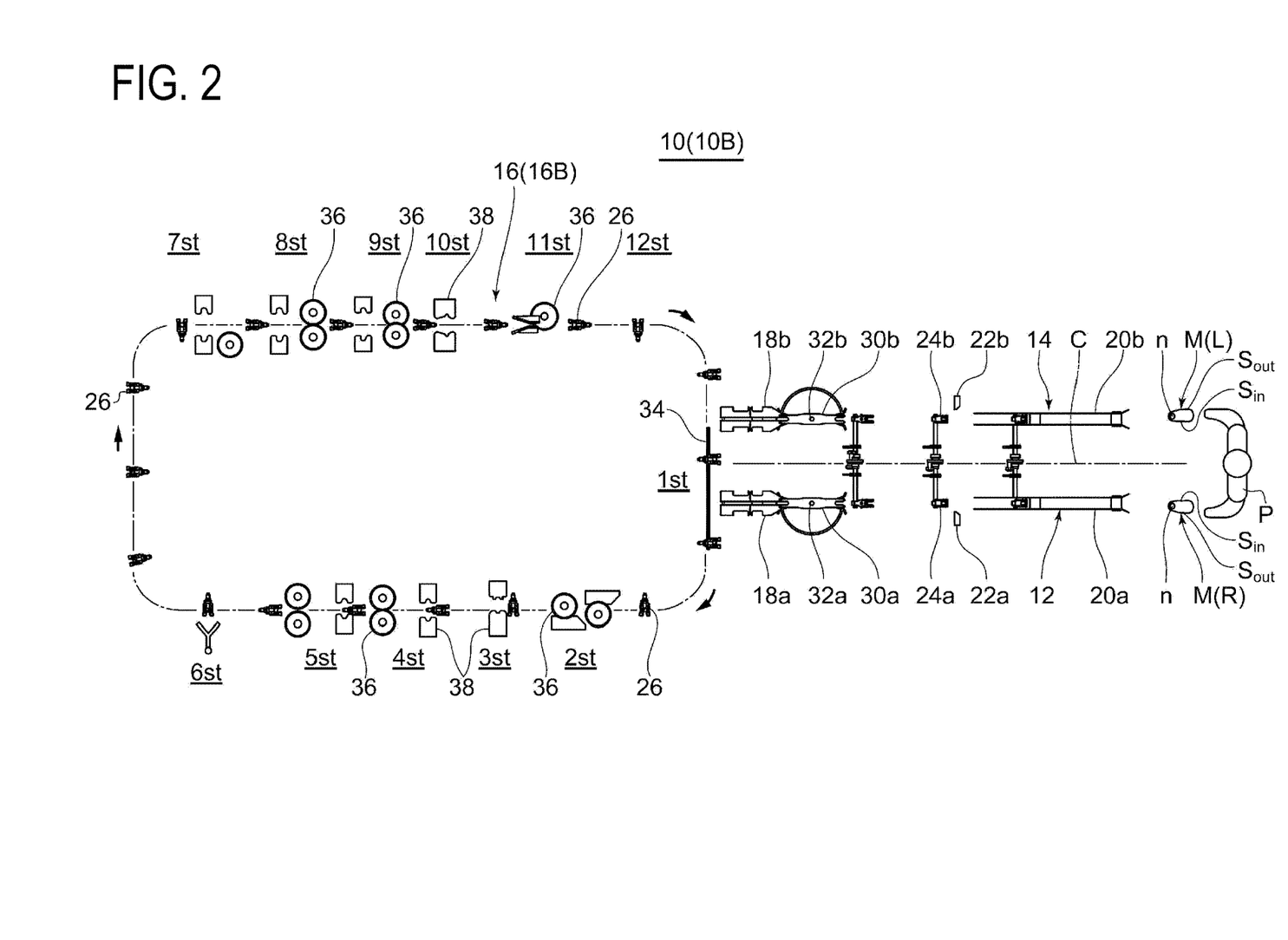
FIG. 2 is a diagram illustrating an entire configuration of a processing system for bone-in limb meats according to an embodiment.

FIGS. 1 and 2 show a processing system 10 (10A, 10B) for bone-in limb meats according to embodiments. The processing system 10 (10A, 10B) includes, at an uppermost stream part of a processing line for a bone-in limb meat M, a right-limb incision-forming portion 12 for forming incision on a right bone-in limb meat M(R) and a left-limb incision-forming portion 14 for forming incision on a left bone-in limb meat M(L). The bone-in limb meat M with incision formed at the right-limb incision-forming portion 12 or the left-limb incision-forming portion 14 is conveyed to a loading portion 1st of a processing line 16 (16A, 16B). The processing line 16 includes a plurality of processing stations for separating the bone-in limb meat M into a bone part and a meat part. The loading portion 1st is arranged at an uppermost upstream part of the plurality of processing stations. Dismantling processing is sequentially performed on the bone-in limb meat M loaded to the loading portion 1st at the plurality of stations of the processing line 16, and finally, the bone part and the meat part are separated.

According to the above configuration, incision is formed on the right bone-in limb meat M(R) at the right-limb incision-forming portion 12 and on the left bone-in limb meat M(L) at the left-limb incision-forming portion 14. Therefore, incision-forming position and configuration of an incision-forming blade of each incision-forming portion can be set fitted to shapes of each bone-in limb meat. Accordingly, since it is not required to change the position and configuration of the incision-forming blade for each of the right and left limbs, the configuration of each incision-forming portion can be simplified and throughput can be increased. Further, since processing on both the right and left limbs after incision-forming is performed at the single processing line 16, installation space of the processing line 16 can be saved.

In an embodiment, as illustrated in FIGS. 1 and 2, the right-limb incision-forming portion 12 and the left-limb incision-forming portion 14 include conveying paths 20a, 20b arranged along a horizontal direction, and incision-forming blades 22a, 22b (first cutting blades) for forming incision on the bone-in limb meats conveyed on the conveying paths 20a, 20b, respectively. The right-limb incision-forming portion 12 and the left-limb incision-forming portion 14, including the conveying paths 20a, 20b and the incision-forming blades 22a, 22b, are arranged symmetrically about a center line C between the conveying paths 20a, 20b.

According to the embodiment, since the right-limb incision-forming portion 12 and the left-limb incision-forming portion 14 are arranged symmetrically about the center line C, when the right and left bone-in limb meats are loaded to the conveying paths 20a, 20b in the same orientation and the incision-forming blades 22a, 22b are inserted thereto from the same side being the inner side or outer side, incision can be formed on both of the right and left bone-in limb meats respectively from an inner side face where skin does not exist. Thus, since it is not required to cut the outer side face where skin exists for the both, boneless meats meeting standards to keep skin uncut can be obtained.

Figure 3:
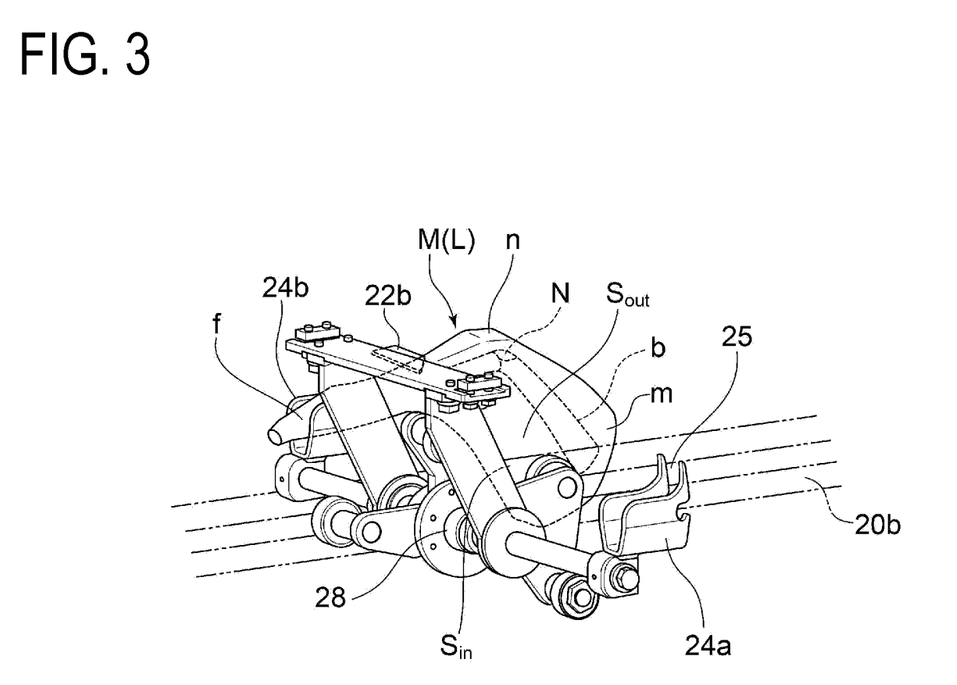
FIG. 3 is a perspective view of an incision-forming portion according to an embodiment.

In an embodiment, as illustrated in FIG. 3, the conveying paths 20a, 20b are configured to be capable of conveying the right and left bone-in limb meats M(R), M(L) in a laterally-oriented posture, that is, a posture in which a bone part b is oriented along the horizontal direction and an inner side face $S_{in}$ and an outer side face $S_{out}$ of each bone-in limb meat are oriented along a vertical direction.

According to the embodiment, through conveying the right and left bone-in limb meats in the above described posture, cutting between the bone part b and the meat part m can be performed along the bone part b by the fixed incision-forming blades 22a, 22b while conveying the right and left bone-in limb meats. Accordingly, since it is not required to stop the bone-in limb meat for incision-forming, processing efficiency can be improved. Further, since the incision-forming blade may be a fixed blade, a driving portion for the incision-forming blade is unnecessary, resulting in cost reduction.

In an embodiment, as illustrated in FIGS. 1 and 2, a worker P loads the right bone-in limb meat M(R) to the right-limb incision-forming portion 12 and the left bone-in limb meat M(L) to the left-limb incision-forming portion 14 with knee parts n of the right and left bone-in limb meats M(R), M(L) oriented toward the incision-forming portions 12, 14. The right-limb incision-forming portion 12 and the left bone-in limb meats M(L) are reversed by an unillustrated reversal machine at inlets of the incision-forming portions 12, 14 and the knee parts n are oriented toward an upstream side (toward the worker P). Then, the right and left bone-in limb meats M(R), M(L) are conveyed on the conveying paths 20a, 20b in the laterally-oriented posture with each knee part n positioned at an upper part. The left bone-in limb meat M(L) in this state is illustrated in FIG. 3 as an example.

The incision-forming blades 22a, 22b are arranged outside the conveying paths 20a, 20b (opposite sides with respect to the center line C). The inner side faces $S_{in}$ of the right and left bone-in limb meats face outward, that is, toward opposite sides with respect to the center line C, and each incision-forming blade 22a, 22b can be inserted from the inner side face $S_{in}$ between a lower face of the bone part b and the meat part m.

Accordingly, since it is not required to cut the outer side face $S_{out}$ where skin exists, high-value boneless meats meeting standards to keep skin uncut can be obtained. Further, since the incision-forming blades 22a, 22b are arranged outside the conveying paths 20a, 20b, maintenance can be easily performed.

In an embodiment, as illustrated in FIGS. 1 and 2, each of the right-limb incision-forming portion 12 and the left-limb incision-forming portion 14 includes a plurality of first clamping units 24a, 24b. As illustrated in FIG. 3, the first clamping units 24a, 24b are configured to be movable along the conveying paths 20a, 20b while holding the right and left bone-in limb meats M(R), M(L).

The processing line 16 includes a plurality of second clamping units 26 which convey the right and left bone-in limb meats, received from the first clamping units 24a, 24b at the loading portion 1st, to a plurality of processing stations 2st to 10st or 2st to 12st in turn.

The loading portion 1st includes a first receiving portion 18a which receives the right bone-in limb meat M(R) from the right-limb incision-forming portion 12 and a second receiving portion 18b which receives the left bone-in limb meat M(L) from the left-limb incision-forming portion 14. Distance between the first receiving portion 18a and the second receiving portion 18b and distance between the adjacent second clamping units 26 are set to be the same.

Further, it is configured such that receiving the right bone-in limb meat M(R) at the first receiving portion 18a and receiving the left bone-in limb meat M(L) at the second receiving portion 18b are simultaneously performed.

According to the embodiment, synchronous control of operation of the first clamping units 24a, 24b and the second clamping units 26 at the first loading portion 1st when delivering the right and left bone-in limb meats from the first clamping units 24a, 24b to the second clamping units 26 is facilitated. That is, the right and left bone-in limb meats simultaneously received from the right and left incision-forming portions 12, 14 may be simultaneously delivered to the two second clamping units 26 without change. By setting processing speed of the bone-in limb meats M at the processing line 16 two times faster than that at the incision-forming portions 12, 14, delivering timing for delivering the right and left bone-in limb meats from the first clamping units 24a, 24b to the second clamping units 26 can be set easily, while improving processing efficiency at the processing line 16.

In an embodiment, as illustrated in FIG. 3, the first clamping units 24a, 24b are integrated via a connecting portion 28. Accordingly, complicated control for simultaneously moving the first clamping units 24a, 24b is not required.

In an embodiment, as illustrated in FIG. 3, each first clamping unit 24a, 24b includes a recess portion 25 opened upward. Limb neck parts f of the right and left bone-in limb meats are inserted to the recess portions 25, the first clamping units 24a, 24b hold the right and left bone-in limb meats, and the right and left bone-in limb meats are conveyed on the conveying paths 20a, 20b.

In an embodiment, as illustrated in FIGS. 1 and 2, the right bone-in limb meat M(R) on which incision is formed at the right-limb incision-forming portion 12 is delivered to the first receiving portion 18a via a delivery portion 30a. The left bone-in limb meat M(L) on which incision is formed at the left-limb incision-forming portion 14 is delivered to the second receiving portion 18b via a delivery portion 30b.

Each delivery portion 30a, 30b includes a recess portion similar to the recess portion 25. The bone-in limb meats are suspended by the recess portions 25, rotated by 180 degrees about axes 32a, 32b, and delivered to the first receiving portion 18a and the second receiving portion 18b.

In an embodiment, each of the first and second receiving portions 18a, 18b is arranged as extending between the corresponding delivery portion 30a, 30b and a conveying path 34 of the second clamping units 26. A slit hole is formed along an extending direction at a center part of each delivery portion 30a, 30b. Each bone-in limb meat M is extruded from the delivery portion 30a, 30b by an unillustrated extrusion unit, and inserted to a holding portion of the second clamping unit 26 via the slit hole.

In an embodiment, distance between the first clamping units 24a, 24b and the distance between the adjacent second clamping units 26 are set to be the same. Moving speed of the plurality of second clamping units 26 are set faster than moving speed of the first clamping units 24a, 24b.

According to the embodiment, synchronous control of operation of the first clamping units 24a, 24b and the second clamping units 26 when delivering the right and left bone-in limb meats from the first clamping units 24a, 24b to the second clamping units 26 is facilitated. Further, processing speed of the bone-in limb meat M at the processing line 16 is faster than that at the incision-forming portions 12, 14 (e.g. two times faster). Therefore, processing efficiency at the processing line 16 can be improved.

In an embodiment, as illustrated in FIGS. 1 and 2, the conveying path 20a of the right-limb incision-forming portion 12 and the conveying path 20b of the left-limb incision-forming portion 14 are arranged in parallel so that the right and left bone-in limb meats are conveyed in an identical conveying direction at the right and left incision-forming portions 12, 14.

According to the embodiment, since the conveying paths 20a, 20b of the right and left incision-forming portions 12, 14 are arranged in parallel, space of the incision-forming portions 12 and 14 can be saved. Further, placing portions to place the bone-in limb meats M to the conveying paths 20a, 20b can be arranged closely to each other, so that operation of placing to both the right and left placing portions can be performed by a single worker P.

In an embodiment, as illustrated in FIGS. 1 and 2, the processing line 16 includes a plurality of processing stations 2st to 10st or 2st to 12st. The bone-in limb meats M held by the second clamping units 26 are conveyed to the processing stations from the second station 2st to the twelfth station 12st in turn along the conveying path 34 and dismantling processing is performed at the respective processing stations.

At least one of the processing stations includes a cutting blade 36 (second cutting blade) for cutting a tendon adhering around the bone part b. Further, at least one of the processing stations includes a separating member 38 capable of engaging with the meat part m of the bone-in limb meat cut by the cutting blade 36 and capable of tearing the meat part m from the bone part b by being moved away from the corresponding second clamping unit 26. The separating member 38 is configured to be capable of moving in the same direction as the second clamping unit 26 in synchronization therewith and capable of moving at the same speed as the conveying speed of the second clamping unit 26 along the conveying path 34.

According to the embodiment, the separating member 38 is capable of tearing the meat part m from the bone part b by being moved away from the second clamping unit 26 while moving in the same direction and at the same speed as the second clamping unit 26. Such bone-meat separation can be performed during movement of the bone-in limb meat M. Accordingly, since the bone-in limb meat M is not required to be stopped during a process of bone-meat separation, processing efficiency can be improved.

Figure 4:
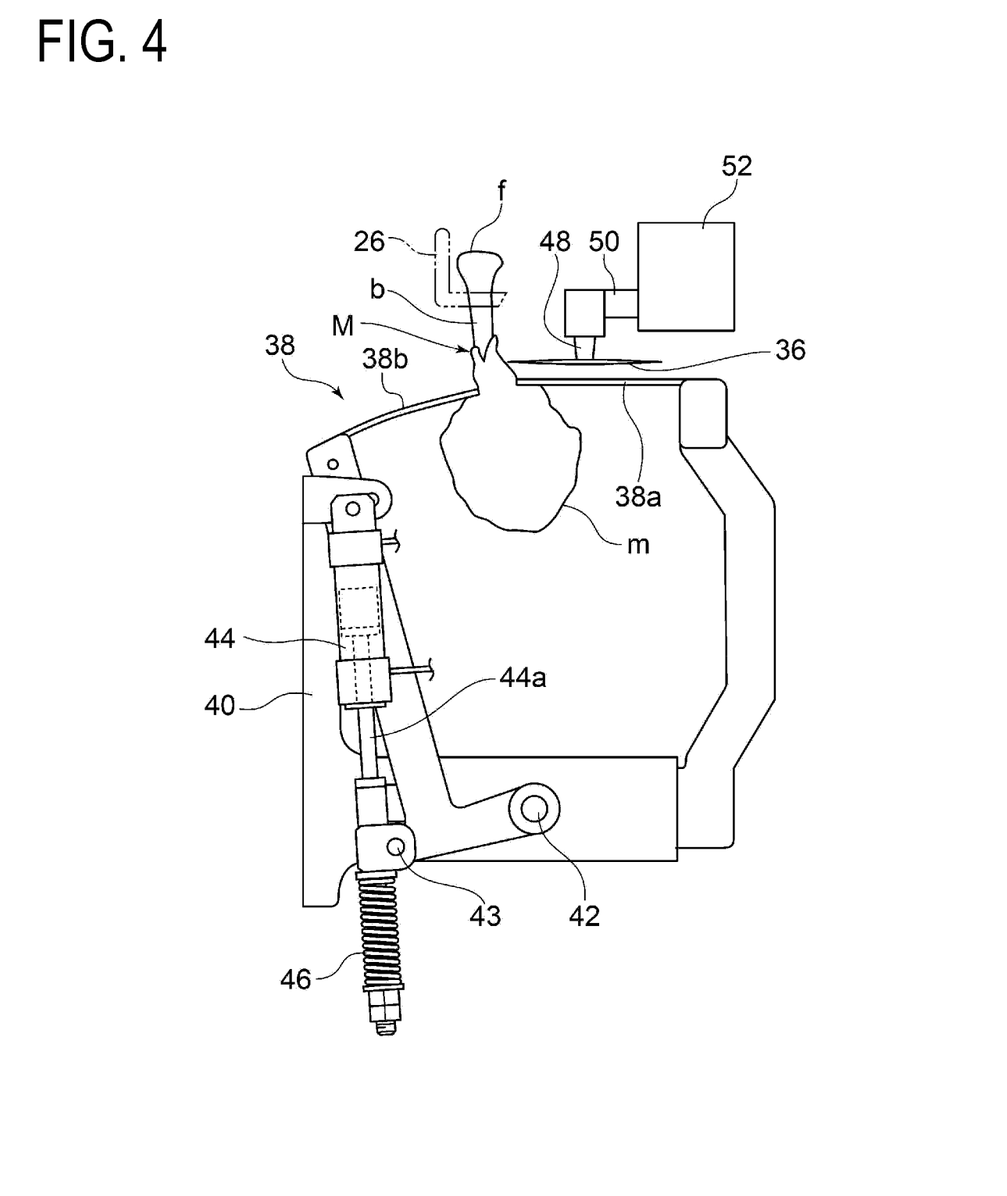
FIG. 4 is a perspective view of a processing station of a processing line according to an embodiment.

FIG. 4 illustrates an example of a processing station including the cutting blade 36 and the separating member 38.

In FIG. 4, a fixed separator 38a of the separating member 38 is fixed to a base portion 40 and another movable separator 38b is rotatably attached to the base portion 40 via a rotary shaft 42. Further, a driving portion 44 to rotate the movable separator 38b is fixed to the base portion 40. According to the above configuration, distance between the fixed separator 38a and the movable separator 38b can be adjusted in accordance with size and shape of the bone-in limb meat M.

The cutting blade 36 is supported by an arm 50 to be capable of getting close to and getting apart from the bone-in limb meat M being conveyed on the conveying path 34. The cutting blade 36 is arranged by one as illustrated, or by two or more to sandwich the bone-in limb meat M.

In an embodiment, the cutting blade 36 is configured by a circular blade which has a circular outer shape and rotates about a rotation axis 48. The cutting blade 36 receives rotating force from a driving portion 52 via the arm 50 to cut a tendon adhering around the bone part b and the meat part m of the bone-in limb meat M. The separating member 38 is capable of engaging, for example, with a cut face cut by the cutting blade 36 and separating the meat part m from the bone part b by being moved away from the second clamping unit 26.

The driving portion 44 is configured by an air cylinder and a piston rod 44a of the air cylinder is connected to the movable separator 38b via a rotary shaft 43. The movable separator 38b can be advanced and retreated with respect to the fixed separator 38a due to reciprocating movement of the piston rod 44a. The piston rod 44a is elastically supported by a coil spring 46 and force in an inverse direction is applied from the coil spring 46 to the piston rod 44a in an elongated state.

The base portion 40 is capable of moving along the conveying path 34 of the bone-in limb meat M at the same speed as the moving speed of the second clamping unit 26. Since the separating member 38 follows movement of the second clamping unit 26, separation of the bone part b and the meat part m can be performed without stopping the bone-in limb meat M while conveying the bone-in limb meat M by the second clamping unit 26.

In an embodiment, as illustrated in FIGS. 1 and 2, the processing line 16 includes a limb neck cutting station (second station 2st), a limb neck tearing station (third station 3st) arranged at a downstream side of the second station 2st in the bone-in meat conveying direction, and an albuginea cutting station (fourth station 4st) arranged at a further downstream side.

At the second station 2st, the tendon adhering around the limb neck part f of the bone-in limb meat M is cut by the cutting blade 36. At the third station 3st, the tendon adhering around the limb neck part f is teared by the separating member 38. At the fourth station 4st, the meat part m of the bone-in limb meat M is separated from the bone part b by the separating member 38 with the albuginea remaining, and the albuginea adhering to the bone part b after the meat part m is separated is cut by the cutting blade 36.

According to the embodiment, at the fourth station 4st, the meat part m of the bone-in limb meat M is first separated from the bone part b with the albuginea remaining, and then, the albuginea is cut. Accordingly, a fibula adhering to a knee joint part at an inner side of the albuginea can be prevented from being separated from the bone part b. Therefore, devaluing of the boneless meat due to mixing of the fibula to the boneless meat can be prevented.

In an embodiment, an X muscle adhering to the bone part b of the knee joint part is cut at the fifth station 5st, and the meat part m adhering to the bone part b of the knee joint part is teared by the separating member 38.

In the processing system 10 (10A) illustrated in FIG. 1, at the sixth station 6st after the fifth station 5st, the tendon adhering to the bone part b of the knee joint part is cut by the cutting blade 36 and the meat part m is teared from the bone part b of the knee joint part by the separating member 38, so that the knee joint part is exposed. At the seventh station 7st, the tendon adhering to the bone part b at the knee joint lower part is cut by the cutting blade 36, and the meat part m adhering to the bone part b at the knee joint lower part is teared by the separating member 38. At the eighth station 8st, the meat part m adhering to the bone part b is teared up to a femoral head by the separating member 38. At the ninth station 9st, final tearing of the meat part m is performed. That is, the second clamping unit 26 is lifted to lift the bone-in limb meat M while holding the meat part m by the separating member 38, so that the meat part m is teared from the femoral head. During the operation, the tendon adhering to a distal end of the femoral head is cut by the cutting blade (circular cutter) 36. At the tenth station 10st, an unillustrated chuck of the second clamping unit 26 is opened, and the bone part b separated from the meat part m drops. The bone part b drops to an unillustrated eject path being different from a path for the meat part m and is ejected.

In the processing system 10 (10B) illustrated in FIG. 2, length from a knee joint part N (see FIG. 3) to a distal end of the meat part m is measured as an option at the sixth station 6st after the fifth station 5st. Then, at the seventh station 7st, an articular muscle of knee at a surface of a knee part n is cut based on the measured value. Thus, a meat to remain at the knee part n is lessened and shifted to the boneless meat side, so that the value of the boneless meat can be enhanced.

The eighth station 8st to the twelfth station 12st of the processing system 10 (10B) corresponds to the sixth station 6st to the tenth station 10st of the processing system 10 (10A) and perform the same processing as that of the sixth station 6st to the tenth station 10st of the processing system 10 (10A).

Figure 5:
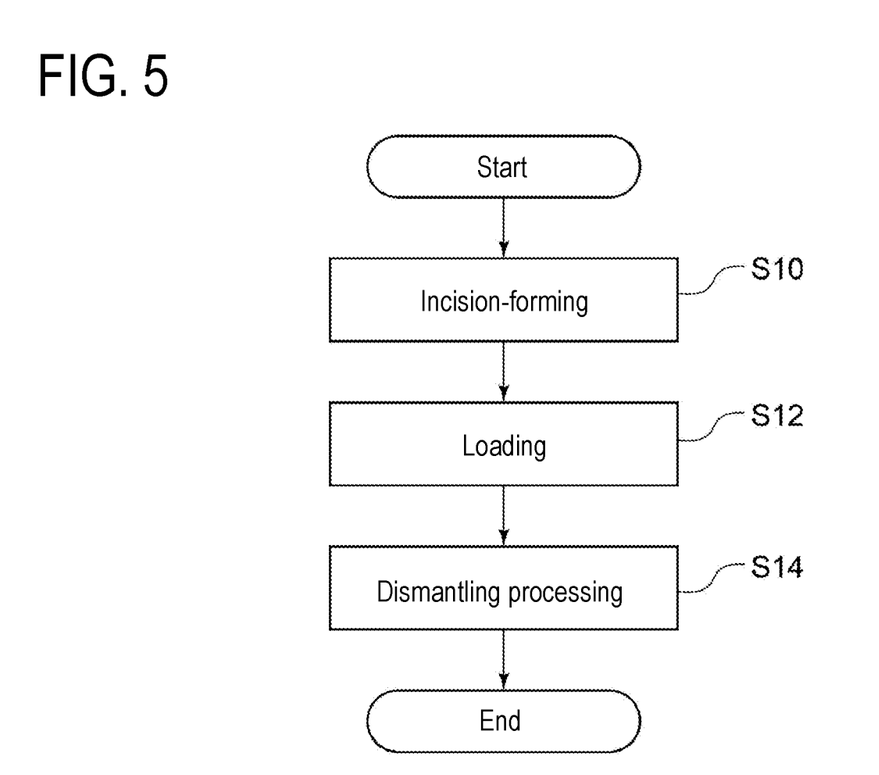
FIG. 5 is a flowchart of a producing method for deboned meats according to an embodiment.

As illustrated in FIG. 5, an incision-forming step S10 is firstly performed in a producing method for deboned meats according to an embodiment. In the incision-forming step S10, incision is formed on the right bone-in limb meat M(R) at the right-limb incision-forming portion 12 and incision is formed on the left bone-in limb meat M(L) at the left-limb incision-forming portion 14. The right and left bone-in limb meats M(R), M(L) with incision formed respectively at the incision-forming portions 12, 14 are loaded to the processing line 16 to separate the bone part b and the meat part m of each bone-in limb meat M (loading step S12). The bone part b and the meat part m of each of the right and left bone-in limb meats M(R), M(L) are separated at the processing line 16 (dismantling processing step S14).

According to the above method, incision is formed on the right bone-in limb meat M(R) at the dedicated right-limb incision-forming portion 12 and incision is formed on the left bone-in limb meat M(L) at the dedicated left-limb incision-forming portion 14. Therefore, incision-forming position and configuration of the incision-forming blade of each incision-forming portion 12, 14 can be set fitted to shapes of each bone-in limb meat M. Accordingly, it is not required to change the position and configuration of the incision-forming blade for each of right and left limbs. Further, since processing on both the right and left limbs after incision-forming is performed at the single processing line 16, installation space of the processing line 16 can be saved.

In an embodiment, throughput for the right bone-in limb meats M(R) and throughput for the left bone-in limb meats M(L) at the incision-forming step S10 are set to be the same, and throughput for the bone-in limb meats M at the dismantling processing step S14 is set larger than throughput at each of the right-limb incision-forming portion 12 and the left-limb incision-forming portion 14.

According to the embodiment, throughput for the right bone-in limb meats M(R) and throughput for the left bone-in limb meats M(L) at the incision-forming step S10 are set to be the same. Therefore, the operation of the incision-forming blades 22a, 22b at the right and left incision-forming portions 12, 14 can be easily synchronized and the incision-forming operation can be easily controlled. Further, throughput for the bone-in limb meats M at the dismantling processing step S14 after incision-forming is set larger than throughput at the incision-forming step S10. Therefore, operation of the first clamping units 24a, 24b and operation of the second clamping units 26 are easily controlled to be synchronized and processing efficiency after incision-forming is improved without lowering throughput at the incision-forming step S10.

In an embodiment, throughput for the right bone-in limb meats M(R) and throughput for the left bone-in limb meats M(L) at the incision-forming step S10 are set to be the same, and throughput for the bone-in limb meats M at the dismantling processing step S14 after incision-forming is set two times larger than throughput at the incision-forming step S10. In this case, operation of the first clamping units 24a, 24b and operation of the second clamping units 26 are easily controlled to be synchronized and processing efficiency after incision-forming is improved without lowering throughput at the incision-forming step S10.

In an embodiment, as illustrated in FIG. 3, the clamping units 24a, 24b are integrated via the connecting portion 28. Therefore, the operation of the first clamping units 24a, 24b can be easily controlled to be synchronized and throughput for the bone-in limb meats M at the right-limb incision-forming portion 12 and throughput therefor at the left-limb incision-forming portion 14 can be easily equaled.

In an embodiment, at the loading step S12, joint parts of a plurality of the bone-in limb meats M are loaded to the processing line 16 as being always oriented in the same direction.

According to the embodiment, since the joint parts of the plurality of the bone-in limb meats M are loaded to the processing line 16 as being always oriented in the same direction, dismantling processing for the right and left bone-in limb meats M can be performed with common processing operation of equipment arranged at the processing line 16. Accordingly, processing efficiency can be improved.

In an embodiment, as illustrated in FIG. 3, the right and left bone-in limb meats M with incision formed at the right and left incision-forming portions in a posture that each knee part n is oriented upward are reversed at the delivery portions 30a, 30b and delivered to the first and second receiving portions 18a, 18b. Accordingly, both the right and left bone-in limb meats M are held in a state that each knee part n faces a back side of the recess portion 25 of the second clamping unit 26.

Thus, since both the right and left bone-in limb meats M are conveyed in a common posture that each knee part n is positioned at the back side of the second clamping unit 26, dismantling processing can be performed with a common processing step. Accordingly, processing efficiency can be improved.

INDUSTRIAL APPLICABILITY

According to one embodiment, it is possible to save installation space of equipment while enabling increase of throughput, when performing dismantling processing of bone-in limb meats of right and left limbs.

REFERENCE SIGNS LIST 10 (10A, 10B) Processing system
12 Right-limb incision-forming portion
14 Left-limb incision-forming portion
16 (16A, 16B) Processing line
18a First receiving portion
18b Second receiving portion
20a, 20b, 34 Conveying path
22a, 22b Incision-forming blade (first cutting blade)
24a, 24b First clamping unit
25 Recess portion
26 Second clamping unit
28 Connecting portion
30a, 30b Delivery portion
32a, 32b Axis
36 Cutting blade (second cutting blade)
38 Separating member
38a Fixed separator
38b Movable separator
40 Base portion
42, 43 Rotary shaft
44, 52 Driving portion
44a Piston rod
46 Coil spring
48 Rotation axis
50 Arm
C Center line
M Bone-in limb meat
M(R) Right bone-in limb meat
M(L) Left bone-in limb meat
N Knee joint part
P Worker
$S_{in}$ Inner side face
$S_{out}$ Outer side face
b Bone part f Limb neck part
m Meat part
n Knee part

The invention claimed is:

1. A processing system for bone-in limb meats, comprising:
a right-limb incision-forming portion for forming an incision on a right bone-in limb meat;
a left-limb incision-forming portion for forming an incision on a left bone-in limb meat;
a processing line including a plurality of processing stations to separate a bone part and a meat part of each bone-in limb meat on which the incision is formed at the right-limb incision-forming portion or the left-limb incision-forming portion; and
a loading portion arranged at an uppermost stream part of the processing line to receive the right bone-in limb meat with the incision formed at the right-limb incision-forming portion and the left bone-in limb meat with the incision formed at the left-limb incision-forming portion.

2. The processing system for the bone-in limb meats according to claim 1,
wherein each of the right-limb incision-forming portion and the left-limb incision-forming portion comprises
a conveying path arranged along a horizontal direction, and
a first cutting blade for performing incision-forming on the bone-in limb meat conveyed on the conveying path, and
the right-limb incision-forming portion and the left-limb incision-forming portion, including the conveying paths and the first cutting blades, are arranged symmetrically about a center line between the conveying paths.

3. The processing system for the bone-in limb meats according to claim 2,
wherein the conveying path of the right-limb incision-forming portion and the conveying path of the left-limb incision-forming portion are arranged in parallel so that the right bone-in limb meat and the left bone-in limb meat are conveyed in an identical conveying direction.

4. The processing system for the bone-in limb meats according to claim 2,
wherein each conveying path is configured to perform conveyance with the bone part of each bone-in limb meat oriented along the horizontal direction and an inner side face and an outer side face of the bone-in limb meat oriented along a vertical direction.

5. The processing system for the bone-in limb meats according to claim 2,
wherein each of the right-limb incision-forming portion and the left-limb incision-forming portion includes a plurality of first clamping units configured to move along a corresponding conveying path while holding the bone-in limb meat,
the processing line includes a plurality of second clamping units configured to convey the bone-in limb meats received from the plurality of first clamping units to the plurality of processing stations,
the loading portion includes a first receiving portion configured to receive the right bone-in limb meat from the right-limb incision-forming portion and a second receiving portion configured to receive the left bone-in limb meat from the left-limb incision-forming portion, with a distance between the first receiving portion and the second receiving portion being the same as a distance between adjacent second clamping units, and
the right bone-in limb meat is received at the first receiving portion simultaneously with the left bone-in limb meat being received at the second receiving portion.

6. The processing system for the bone-in limb meats according to claim 5,
wherein a distance between adjacent first clamping units and the distance between the adjacent second clamping units are the same, and
a moving speed of the plurality of the second clamping units is faster than a moving speed of the plurality of the first clamping units.

7. The processing system for the bone-in limb meats according to claim 5,
wherein at least one of the processing stations includes a second cutting blade for cutting a periphery of the bone part and a separating member configured to engage with the meat part of the bone-in limb meat cut by the second cutting blade and configured to tear the meat part from the bone part by being moved away from a corresponding second clamping unit, and
the separating member is configured to move at the same speed as a conveying speed of the plurality of second clamping units and in synchronization with the plurality of second clamping units along a conveying direction of the plurality of second clamping units.

8. The processing system for the bone-in limb meats according to claim 7,
wherein the plurality of processing stations includes a limb neck cutting station including the second cutting blade for cutting a tendon adhering around a limb neck part of the bone-in limb meat, and an albuginea cutting station arranged at a downstream side of the limb neck cutting station in a conveying direction of the bone-in meat and including the separating member for separating a meat part at the cut part of the bone-in limb meat having the cut tendon at the limb neck part from the bone part and the second cutting blade for cutting albuginea adhering around the bone part with the meat part separated.

9. A producing method for deboned meats comprising:
forming an incision on a right bone-in limb meat and a left bone-in limb meat respectively at different incision-forming portions;
loading the right bone-in limb meat having the formed incision and the left bone-in limb meat having the formed incision to a single processing line for separating a bone part and a meat part of each of the right bone-in limb meat and the left bone-in limb meat; and
separating the bone part and the meat part of each of the right bone-in limb meat and the left bone-in limb meat loaded to the single processing line.

10. The producing method for the deboned meats according to claim 9,
wherein throughput for forming incisions in right bone-in limb meats is the same as throughput for forming incisions in left bone-in limb meats, and
throughput for separating the bone part and the meat part of right bone-in limb meats and left bone-in limb meats is larger than the throughput for forming the incisions in the right bone-in limb meats and the left bone-in limb meats.

11. The producing method for the deboned meats according to claim 9,
wherein the loading the right bone-in limb meat having the formed incision and the left bone-in limb meat having the formed incision to the single processing line is performed with knee parts of the right bone-in limb meat and the left bone-in limb meat oriented in an identical direction.

* * * * *